United States Patent [19]
Agarwal et al.

[11] Patent Number: 4,537,919
[45] Date of Patent: Aug. 27, 1985

[54] GELATION OF HYDROCARBON SOLUTIONS OF BLENDS OF ASSOCIATING AND NON-ASSOCIATING POLYMERS

[75] Inventors: Pawan K. Agarwal, Westfield; Robert D. Lundberg, Bridgewater, both of N.J.

[73] Assignee: Exxon Research and Engineering Co., Florham Park, N.J.

[21] Appl. No.: 643,693

[22] Filed: Aug. 24, 1984

[51] Int. Cl.$^3$ ............................. C08J 3/00; C08J 3/20
[52] U.S. Cl. .................................. 523/336; 523/351; 524/481; 524/484; 524/516
[58] Field of Search ............... 523/336, 351; 524/481, 524/484, 516

[56] References Cited
U.S. PATENT DOCUMENTS

| | | | |
|---|---|---|---|
| 4,208,310 | 6/1980 | Lundberg et al. | 524/322 |
| 4,282,130 | 8/1981 | Lundberg et al. | 524/364 |
| 4,304,702 | 12/1981 | Makowski et al. | 525/344 |
| 4,313,862 | 2/1982 | Lundberg et al. | 524/113 |
| 4,322,329 | 3/1982 | Lundberg et al. | 524/111 |
| 4,465,801 | 8/1984 | Peiffer et al. | 524/111 |

Primary Examiner—Joseph L. Schofer
Assistant Examiner—N. Sarofim
Attorney, Agent, or Firm—Richard E. Nanfeldt

[57] ABSTRACT

A process for forming a thickened fluid having a viscosity of at least about 50 cps which includes the steps of:
(a) forming two solvent systems one of an organic liquid and the other of said organic liquid and a polar cosolvent, said polar cosolvent being less than about 15 weight percent of each said solvent system, a viscosity of each said solvent system being less than about 100 cps;
(b) dissolving a water insoluble sulfonated elastomeric polymer in said first solvent system to form a first solution, a concentration of said sulfonated polymer in said first solution being about 0.02 to about 10 weight percent, a viscosity of said first solution being less than about 2000 cps;
(c) dissolving an elastomeric polymer in said second solvent system of said organic liquid to form a second solution, a concentration of said elastomeric polymer in said second solution being about 0.2 to about 10 weight percent, a viscosity of said solution being less than about 2000 cps;
(d) mixing said first solution and said solution to form a solution of said sulfonated elastomeric polymer and said elastomeric polymer; and
(e) adding about 5 to about 500 volume percent water to said solution of said sulfonated elastomeric polymer and said elastomeric polymer, said water being immiscible with said solution of said sulfonated elastomeric polymer and said elastomeric polymer, said polar cosolvent transferring from said organic liquid to said water thereby causing the viscosity of said organic liquid to increase to at least 5000 cps.

16 Claims, 2 Drawing Figures

GELATION OF HYDROCARBON SOLUTIONS OF BLENDS OF ASSOCIATING AND NON-ASSOCIATING POLYMERS

BACKGROUND OF THE INVENTION

1. Field of the Invention

The present invention relates to a process for the viscosification of an organic liquid which includes the steps of forming two solvent systems one of an organic liquid or oil and the other of an organic liquid or oil and a polar cosolvent, the polar cosolvent being less than about 15 weight percent of the solvent systems, a viscosity of both solvent systems being less than about 1,000 cps; dissolving an anionic polymer such as neutralized sulfonated elastomeric polymer (water insoluble) in the solvent systems of the organic liquid and polar cosolvent to form a first solution, and dissolving an unsulfonated elastomeric polymer using the same polymeric backbone as the sulfonated polymer in the organic liquid to form a second solution, a concentration of the neutralized sulfonated polymer in the first solution being about 0.2 to about 10 weight percent, a concentration of the unsulfonated elastomeric polymer in the second solution being about 0.2 to about 10 weight percent, the viscosity of both solutions being less than about 2,000 cps; mixing both solutions together to form a solution of an interpolymer network of sulfonated elastomeric polymer and copolymer, and admixing or contacting said solution of said sulfonated elastomeric polymer and said unsulfonated elastomeric polymer with about a 5 to about 500 volume percent water, the water being immiscible with the organic liquid and the polar cosolvent transferring from the organic liquid to the water phase, thereby causing the polymer containing phase to gel (i.e. thicken).

2. Description of the Prior Art

There are many applications for very viscous or gelled solutions which are quite diverse. There are also a number of physical and chemical techniques for preparing such systems. The present invention is concerned with a process for gelling a fluid system by contacting the fluid system with a relatively low viscosity, organic liquid solution of interpenitrating polymers. The potential applications for this process and the products derived therefrom will be evident in the instant application. Some of these applications are as a viscosifier for hydrocarbon solutions, such as a shut-off technique in oil well applications and a spacer or soluble plug in oil well applications.

The instant invention differs from a number of applications, Ser. Nos. 223,482; 136,837; and 106,027, filed by Robert Lundberg et al, one of the instant inventors. These previously filed applications were directed to the gelling of the organic liquid by a water insoluble, neutralized sulfonated polymer whereas the instant invention is directed to the gelling of an organic fluid by a mixture of a sulfonated polymer and unsulfonated polymer.

In the current invention, two polymers are mixed to produce an interpolymer network which at relatively low concentration forms a three-dimensional network with a gel-like behavior. The blends of an associating and a non-associating polymer are much more effective in forming a network than are single associating polymers leading to gels of higher strength.

Controlled gelation is achieved by dissolving the two polymers in the presence of a cosolvent which can ultimately be removed causing instantaneous gelation. The cosolvent acts to prevent efficient formation of a three-dimensional network and hence helps in reducing solution viscosity. However, as soon as the cosolvent is removed, a network is formed. In this way, the polymer solution containing a cosolvent can be transported or pumped into a region where gelation is desired, and the cosolvent will be removed at that region.

The instant invention describes a process which permits (1) the preparation of polymer solutions of the sulfonated polymer and unsulfonated polymer in organic liquid having reasonably low viscosities (i.e., less than about 200 cps); and (2) the preparation of extremely viscous solutions or gels of the organic fluid from such solutions by a process of mixing or contacting water with the polymer solution. These operations are achieved by the use of the appropriate concentration: about 0.2 to 10.0 weight percent of water insoluble, sulfonated and unsulfonated polymers.

In the instant process, the role of the polar cosolvent is that of solvating the ionic groups while the main body of the solvent interacts with the polymer backbone. For example, xylene is an excellent solvent for the polystyrene backbone and when combined with 5 percent methanol will dissolve, readily and rapidly, the previous example of lightly sulfonated polystyrene.

The remarkable and surprising discovery of the instant invention is that when small (or large) amounts of water are combined and mixed with solutions of ionic polymers dissolved at low concentrations (about 0.2 to 10 weight percent) in such mixed solvent systems as those described above, a phase transfer of the cosolvent occurs from the nonpolar organic liquid phase to the water phase, thus by causing the polymer containing phase to gel (i.e. thicken). Indeed, it is possible to achieve increases in viscosity of the polymer solution by factors of $10^3$ (1,000) or more by the addition of only 5 to 15 percent water based on the polymer solution volume. This unusual behavior is postulated to arise from the removal of the polar cosolvent from the organic liquid phase into the separate aqueous phase.

In the instant invention, the interpolymer network in hydrocarbon solution is obtained by mixing two polymers which will strongly enhance the relaxation times of the system. One polymer contains anionic groups along or pendant to its backbone which may be either partially or fully neutralized and thus is an associating polymer. The other could be the precursor polymer from which the associating polymer is made of, or any other polymer whose molecular architecture is nearly the same as the backbone of the associating polymer. The former criterion is desired, since it assures the dissolution of the polymers without macroscopic phase separation. In solution the caging effects of the non-associating polymer chains around and along the associating sites of the associating polymer chains is believed to lead to strong network formation.

A polar cosolvent added to the polymer blend solution interferes with network formation and thus reduces the viscosity or gel characteristics of the solution.

A solution of such a polymer blend system in the presence of a cosolvent will have a relatively low viscosity. Gelation of this solution will be affected by removing the cosolvent. Such removal can be obtained by selective extraction, evaporation of a volatile cosolvent, chemical reaction, precipitation, absorption, or any other method that would shift the balance from the state of interaction the polymer functional group to another preferred state.

A simple means for extraction of a polar cosolvent is the addition of water or a second polar fluid to the solution. If the second fluid is not miscible with the primary solvent, an extraction will take place into the second phase. The new equilibrium will be a function of the volume of each phase as well as temperature and pressure conditions. Equilibrium can be further shifted by adding an adsorbing or reacting species to the extracting phase.

SUMMARY OF THE INVENTION

The present invention relates to a process for the viscosification of an organic liquid which includes the steps of forming two solvent systems one of an organic liquid or oil and the other of an organic liquid or oil and a polar cosolvent, the polar cosolvent being less than about 15 weight percent of the solvent systems, a viscosity of both solvent systems being less than about 1,000 cps; dissolving an anionic polymer such as neutralized sulfonated elastomeric polymer (water insoluble) in the solvent systems of the organic liquid and polar cosolvent to form a first solution,, and dissolving an unsulfonated elastomeric polymer using the same polymeric backbone as the sulfonated polymer in the organic liquid to form a second solution, a concentration of the neutralized sulfonated polymer in the first solution being about 0.2 to about 10 weight percent, a concentration of the unsulfonated elastomeric polymer in the second solution being about 0.2 to about 10 weight percent, the viscosity of both solutions being less than about 2,000 cps; mixing both solutions together to form a solution of an interpolymer network of sulfonated elastomeric polymer and copolymer, and admixing or contacting said solution of said sulfonated elastomeric polymer and said unsulfonated elastomeric polymer with about a 5 to about 500 volume percent water, the water being immiscible with the organic liquid and the polar cosolvent transferring from the organic liquid to the water phase, thereby causing the polymer containing phase to gel (i.e. thicken).

Accordingly, it is a primary object of the instant invention to describe an economical process for forming a highly viscous or gelled polymer solution having a viscosity greater than about 50,000 cps preferably greater than about 500,000 cps.

A further object of the instant invention is to provide a process for forming a gel solution which can be used as a viscosifier.

A still further object of the instant invention is to employ the instant process as an integral part of well control procedures such as enhanced oil recovery, water shut-off means, viscous foams and spacers and soluble plugs.

GENERAL DESCRIPTION

Figure 1:
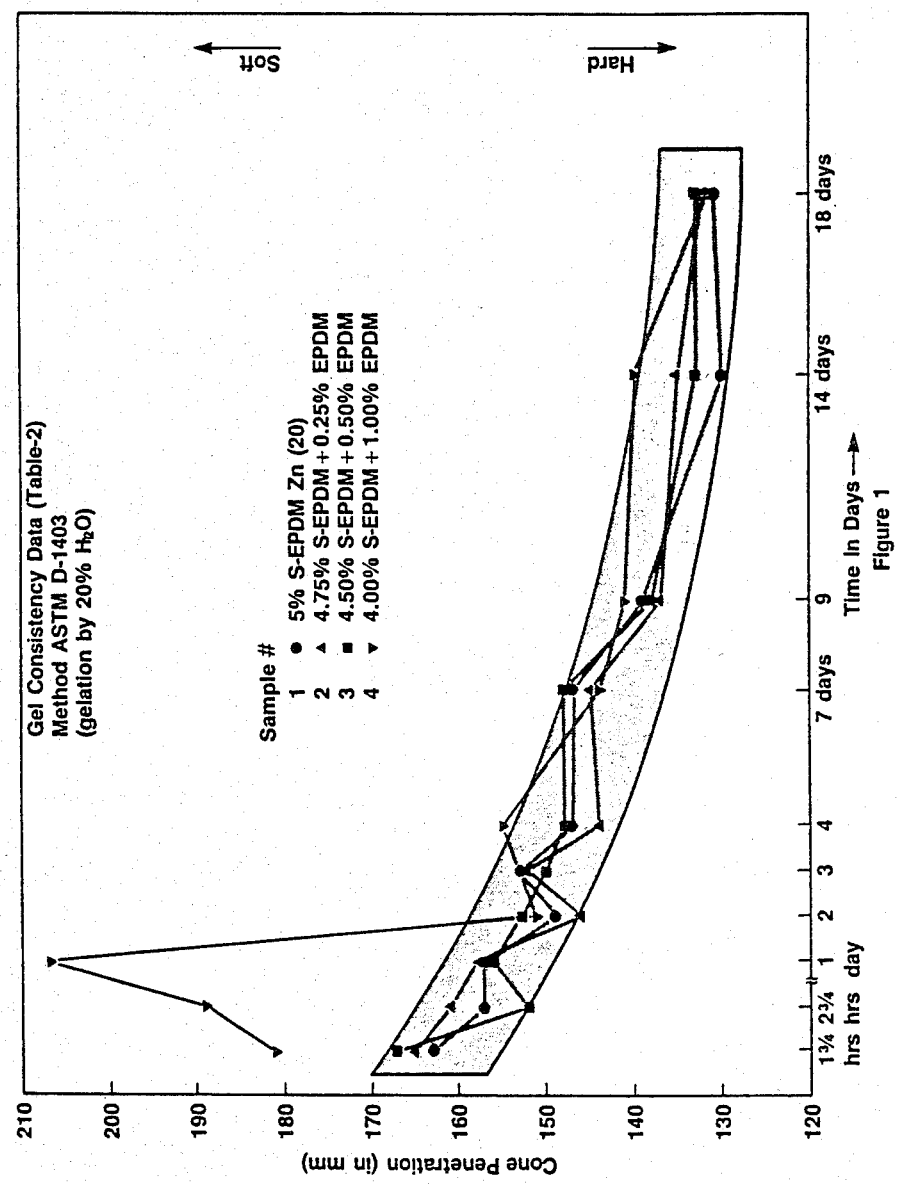
FIG. 1 illustrates the gel consistency of the polymers of the instant invention wherein gelation was by 20% water.

The present invention relates to a process for the viscosification of an organic liquid which includes the steps of forming two solvent systems one of an organic liquid or oil and the other of an organic liquid or oil and a polar cosolvent, the polar cosolvent being less than about 15 weight percent of the solvent systems, a viscosity of both solvent systems being less than about 1,000 cps; dissolving an anionic polymer such as neutralized sulfonated elastomeric polymer (water insoluble) in the solvent systems of the organic liquid and polar cosolvent to form a first solution, and dissolving an unsulfonated elastomeric polymer using the same polymeric backbone as the sulfonated polymer in the organic liquid to form a second solution, a concentration of the neutralized sulfonated polymer in the first solution being about 0.2 to about 10 weight percent, a concentration of the unsulfonated elastomeric polymer in the second solution being about 0.2 to about 10 weight percent, the viscosity of both solutions being less than about 2,000 cps; mixing both solutions together to form a solution of an interpolymer network of sulfonated elastomeric polymer and copolymer, and admixing or contacting said solution of said sulfonated elastomeric polymer and said unsulfonated elastomeric polymer with about a 5 to about 500 volume percent water, the water being immiscible with the organic liquid and the polar cosolvent transferring from the organic liquid to the water phase, thereby causing the polymer containing phase to gel (i.e. thicken).

The gelled polymer solution have a viscosity greater than 50,000 cps is formed by the addition of water to the polymer solution which comprises a water insoluble sulfonated elastomeric polymer and a water insoluble elastomeric polymer, an organic liquid and a polar cosolvent, wherein the solution has a viscosity less than 2,000 cps. The concentration of the mixture of the sulfonated and unsulfonated polymer in the solution is 0.2 to 10 weight percent. Upon the addition of water to the solution of the sulfonated and unsulfonated polymer the polar cosolvent rapidly transfers from the solution to the aqueous phase cursing immediate gelation. The water can be removed by conventional liquid extraction methods.

The volume ratio of polymer solution to the extracting fluid is in a range of 100:1 to 0.5:1. An infinite amount of the extracting fluid can be used in applications where the gel sticks to the surrounding medium in the process. It is preferred to contact the solution of the sulfonated elastomeric polymer and the elastomeric polymer with water under a high shear condition during the extraction process.

The component materials of the instant process generally include a water insoluble neutrally sulfonated elastomeric polymer and/or a water insoluble elastomeric polymer having the same backbone as the sulfonated polymer, complex at a concentration level of 0.2 to 10 weight percent, a nonpolar organic liquid, polar cosolvent and water.

The EPDM terpolymers are low unsaturated polymer having about 1 to about 10.0 wt.% olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt.% ethylene and about 1 to about 10 wt.% of a diene monomer, the balance of the polymer being propylene. Preferably, the polymer contains about 45 to about 70 wt.% ethylene, e.g., 50 wt.% and about 2.6 to about 8.0 wt.% diene monomer, e.g., 5.0 wt.%. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2 norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt.% and a 5-ethylidene-2-norbornene content of about 5.0 wt.%. The Mn was measured by GPC of Vistalon 2504 is about 47,000, the Mv as measured by GPC is about 145,000 and the Mw as measured by GPC is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The Mn as measured by GPC of Vistalon 2504-20 is about 26,000, the Mv as measured by GPC is about 90,000 and the Mw as measured by GPC is about 125,000.

Nordel 1320 (DuPont) is another terpolymer having a Mooney viscosity at 212° F. of about 25 and having about 53 wt.% of ethylene, about 2.5 wt.% of 1,4-hexadiene, and about 43.5 wt.% of propylene.

The EPDM terpolymers of this invention have a number average molecular weight (Mn) as measured by GPC of about 10,000 to about 200,000, more preferably about 15,000 to about 100,000, most preferably about 20,000 to about 60,000. The Mooney viscosity (ML, 1+8, 212° F.) of the EPDM terpolymer is about 5 to about 60, more preferably about 10 to about 50, most preferably about 15 to about 40. The Mv measured by GPC of the EPDM terpolymer is preferably below about 350,00 and more referably below about 300,00. The Mw as measured by GPC of the EPDM terpolymer is preferably below about 500,000 and more preferably below about 350,000.

In carrying out the invention, the polymer is dissolved in a nonreactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane, or heptane. The preferred solvents are the lower boiling aliphatic hydrocarbons. A sulfonating agent is added to the solution of the elastomeric polymer and nonreactive solvent at a temperature of about $-100°$ C. to about 100° C. for a period of time of about 1 to about 60 minutes, more preferably at room temperature for about 5 to about 45 minutes; and most preferably about 15 to about 30 minutes. Typical sulfonating agents are described in U.S. Pat. Nos. 3,642,728 and 3,836,511, previously incorporated herein by reference. These sulfonating agents are selected from an acyl sulfate, a mixture of sulfuric trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis based are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated elastomeric polymer has about 2 to about 50 meq unneutralized sulfonate groups per 100 grams of sulfonated polymer, more preferably about 5 to about 45; and most preferably about 7 to about 40. The meq of unneutralized sulfonate groups per 100 grams of polymer is determined by both titration of the polymeric sulfonic acid and dietert sulfur analysis. In the titration of the sulfonic acid, the polymer is dissolved in solvent consisting of 95 parts of toluene and 5 parts of methanol at a concentration level of 50 grams per liter of solvent. The unneutralized form is titrated with ethanolic sodium hydroxide to an Alizarin-Thymolphthalein endpoint.

The unneutralized sulfonated polymer is gel free and hydrolytically stable. Gel is measured by stirring a given weight of polymer in a solvent comprised of 95 toluene-5-methanol at a concentration of 5 wt.% for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the sulfonated polymers with appropriate metal hydroxides, metal acetates, metal oxides, or ammonium hydroxide etc., can be conducted by means well-known in the art. For example, the sulfonation process as with EPDM terpolymer containing a small 0.3 to 1.0 mole percent unsaturation can be conducted in a suitable solvent such as toluene, with acetyl sulfate as the sulfonated agent, such as described in U.S. Pat. No. 3,836,511. The resulting sulfonic acid derivative can then be neutralized with a number of different neutralization agents such as a sodium phenolate and similar metal salts. The amounts of such neutralization agents employed will normally be equal stoichiometrically to the amount of free acid in the polymer plus any unreacted reagent which is still present. It is preferred that the amount of neutralizing agent be equal to the molar amount of sulfonating agent originally employed plus 10 percent more to insure full neutralization. The use of more of such neutralization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected.

The degree of neutralization of said sulfonate groups may vary from 0 (free acid form) to greater than 100 mole percent, preferably 50 to 100 percent. With the utilization of neutralized sulfonate groups in this instant invention, it is preferred that the degree of neutralization be substantially complete, that is with no substantial free acid present and without substantial excess of the base other than that needed to insure neutralization. The neutralized sulfonated polymer possess greater thermal stability compared to its acid form. Thus, it is clear that the polymers which are normally utilized in the instant invention comprise substantially neutralized pendant groups, and in fact, an excess of the neutralizing material may be utilized without defeating the objects of the instant invention.

The sulfonated polymers of the instant invention may vary in number average molecular weight from 1,000 to 10,000 preferably from 5,000 to 500,000, most preferably from 10,000 to 200,000. These polymers may be prepared by methods known in the art, for example, see U.S. Pat. No. 3,642,728, hereby incorporated by reference.

The water insoluble sulfonated elastomeric polymer may be incorporated into the organic liquid and polar cosolvent to form a first solution at a concentration level of from 0.2 to 10 weight percent and more preferably from about 0.5 to 10 weight percent, based on the organic liquid and the polar cosolvent.

The sulfonated polymers of the instant invention may be prepared prior to incorporation into the organic solvent, or by neutralization of the acid from a situ. For example, preferably the acid derivative is neutralized immediately after preparation. For example, if the sulfonation of polystyrene is conducted in solution, then the neutralization of that acid derivative can be conducted immediately following the sulfonation procedure. The neutralized anionic polymer may then be isolated by means well-known to those skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

It is also possible to neutralize the acid form of these sulfonated polymers in situ; however, this is not a preferred operation since in situ neutralization requires preparation of the sulfonic acid in the organic liquid which is to be subjected to the instant process, or the acid form of the anionic polymer must be dissolved in said organic liquid. The latter approach may involve handling of an acid form of an anionic polymer which has limited thermal stability. Therefore, it is quite apparent that the preparation and isolation of a neutralized anionic polymer affords the maximum latitude in formulation, less problems in handling polymers of limited thermal stability and maximum control over the final mixture of anionic polymer, polar cosolvent and organic liquid.

The water insoluble unsulfonated elastomeric polymer may be incorporated into the organic liquid to form a second solution at a concentration level of from 0.2 to 10 weight percent, and more preferably from about 0.5 to 10 weight percent, based on the organic liquid.

The concentration of the blend of the sulfonated polymer and unsulfonated polymer in the solution of organic liquid and polar cosolvent is about 0.3 to 10 weight percent. The ratio of the sulfonated elastomeric polymer to the elastomeric polymer is about 99/1 to 50/50, more preferably 98/2 to 70/30.

The organic liquids, which may be utilized in the instant invention, are selected with relation to the polymeric backbone of the EPDM terpolymer. The organic liquid is selected from the group consisting essentially of aromatic hydrocarbons, cyclic aliphatic ethers, aliphatic ethers, or organic aliphatic esters and mixtures thereof.

The first solution of the sulfonated elastomeric polymer and the second solution of the elastomeric polymer are mixed together to form a polymeric network in the formed solution. The molar ratio of the neutralized sulfonated elastomeric polymer/elastomeric polymers is about 99.5/0.5 to about 50/50, more preferably about 99/1 to about 60/40, and most preferably about 98/2 to about 70/30.

Specific examples of organic liquids to be employed with the EPDM terpolymers are: pentane, aliphatic and aromatic solvents, oils such as Solvent "100-Neutral", "150 Neutral" and similar oils, benzene, diesel oil, toluene, xylene, ethyl benzene, pentane, hexane, heptane, octane, isoctane, nonane, decane aromatic solvents, ketone solvents.

The method of the instant invention includes incorporating a polar cosolvent, for example, a polar cosolvent in the mixture of organic liquid and water insoluble sulfonated polymer to solubilize the pendant sulfonate groups. The polar cosolvent will have a solubility parameter of at least 10.0, more preferably at least 11.0 and is water miscible and may comprise from 0.1 to 15.0 weight percent, preferably 0.1 to 5.0 weight percent of the total mixture of organic liquid, water insoluble anionic polymer, and polar cosolvent. The solvent system of polar cosolvent and organic liquid in which the water insoluble neutralized sulfonated (anionic) polymer is dissolved contains less than about 10 weight percent of the polar cosolvent, more preferably about 0.1 to about 5.0 weight percent, and most preferably about 0.1 to about 5.0 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting of essentially of water soluble alcohols, amines, di- or tri-functional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol, and n-ethylformamide.

The amount of water added to the solution of water insoluble, neutralized sulfonated elastomeric polymer, water insoluble elastomeric polymer, organic liquid and polar cosolvent having a viscosity of less than about 2,000 cps, is about 5 to about 500 volume percent of water, more preferably about 10 to about 300 volume percent water, most preferably about 10 to about 200 volume percent water.

DETAILED DESCRIPTION OF THE PREFERRED EMBODIMENT

The following examples will demonstrate the performance of the blend of elastomeric polymer and sulfonated elastomeric polymer at varying gel strength levels.

EXAMPLE 1 (Preparation of Sulfo EPDM Polymer)

Five hundred grams of an EPDM terpolymer (MD-76-5) was dissolved under agitation in 5000 ml. of n-hexane at about 40° C. After all this polymer was dissolved, the solution was cooled to low temperature and 17.22 ml. of active anhydride (182.25 mmoles) was added. After that, while stirring the mixture 6.31 cc of 95% $H_2SO_4$ (11.50 mmoles) was added dropwise, the stirring of the solution was continued for an additional 30 minutes for the sulfonation reaction to complete. After this period, the sulfonation reaction was inactivated by adding 28.63 gm of zinc acetate dissolved in 400/20 ml. mixture of $CH_3OH/H_2O$. Antioxidant 2246 (2.5 gm) was then added to the cement and stirring was continued for an additional 30 minutes. The resultant neutralized sulfonated EPDM terpolymer was isolated by steam stripping. It was then washed with distilled water and pulverized with water in a Waring Blender, followed by filtering by a rubber drum. The final drying of the polymer was done in an aromatic dryer at 100° C.

The sample is identified as zinc neutralized sulfonated EPDM terpolymer TP-319.

The sulfur analyses of this sample was done by Dietert Sulfur analysis and was found to have sulfonate group of 20 meq. per 100 gm of sulfonated polymer.

EXAMPLE 2 (Preparation and Composition of Solutions of S-EPDM and EPDM)

Table 1 shows the composition of four solutions which were made in this series of experiments. TP-319 is a zinc salt of sulfonated EPDM polymer described in detail in Example 1 and is an associating polymer. The sulfonation level of this polymer is about 20 meq. The non-associating polymer used was EPDM (MD-76-5). Its weight average molecular weight is about 81,000 and Mw/Mn 2.1. The solvent and cosolvent used were xylene and methanol, respectively. The composition of solvent-cosolvent was 95/5 volume basis.

TABLE 1

| Sample No. | Amount of Associating Polymer TP-319 | Amount of Non-Associating Polymer EPDM |
|---|---|---|
| 1 | 5 gms | 0.20 gms |
| 2 | 4.5 gms | 0.25 gms |
| 3 | 4.50 gms | 0.50 gms |
| 4 | 4.0 gms | 1.00 gms |

All the solutions were made at 5 wt % concentration in xylene/methanol 95/5

EXAMPLE 3 (Gelation and Strength Measurements)

Various solutions of Example 3 were gelled by contacting the solutions with water under high shear at ambient conditions. To obtain the desired gel strength in this example 20% water was used. To 50 c.c. of each solution 10 c.c. of water was added under high speed stirrer. Gel consistency measurements were made following the cone penetration method described in ASTM D-1403 (Vol. 17) used typically for lubricating greases. The total weight of cone and shaft used was 37.3 g (half-scale cone). Penetration in units of 0.1 mm was taken 5 seconds after the cone was released. Measurements were conducted as a function of time. The data are shown in Table 2 and graphically depicted in FIG. 1.

TABLE 2

| | Gel Consistency of Samples of Table 1 5 Sec. Penetration by ½ Scale Cone in m.m. Gelation by 20% Water | | | |
|---|---|---|---|---|
| Time Elapsed After Gelation | Sample No. 1 (5% TP-319) | Sample No. 2 (4.75% TP-319 + 0.25% EPDM) | Sample No. 3 (4.50% TP-319 + 0.50% EPDM) | Sample No. 4 (4.0% TP-319 + 1.0% EPDM) |
| 1 hr, 45 min. | 163 m.m. | 165 m.m. | 167 m.m. | 181 m.m. |
| 2 hrs, 45 min. | 157 m.m. | 161 m.m. | 152 m.m. | 189 m.m. |
| 1 day | 157 m.m. | 158 m.m. | 156 m.m. | 207 m.m. |
| 2 days | 149 m.m. | 146 m.m. | 153 m.m. | 151 m.m. *(0.5 c.c.) |
| 3 days | 153 m.m. | 152 m.m. | 150 m.m. | 155 m.m. *(0.2 c.c.) |
| 4 days | 147 m.m. | 144 m.m. | 148 m.m. | 144 m.m. *(0.2 c.c.) |
| 7 days | 147 m.m. | 145 m.m. | 148 m.m. | 141 m.m. *(1.0 c.c.) |
| 9 days | 139 m.m. | 137 m.m. | 138 m.m. | 140 m.m. *(0.4 c.c.) |
| 14 days | 130 m.m. | 135 m.m. | 133 m.m. | 140 m.m. *(0.5 c.c.) |
| 18 days | 131 m.m. | 132 m.m. | 133 m.m. | 132 m.m. *(0.2 c.c.) |

*Excess liquid expelled by gel and poured off before measurement.

The observation of excess organic liquid in the system with the highest level of EPDM is another manifestation of stronger ionic interactions in that case (or a more compact network).

EXAMPLE 4 (Gelation and Strength Measurements)

Figure 2:
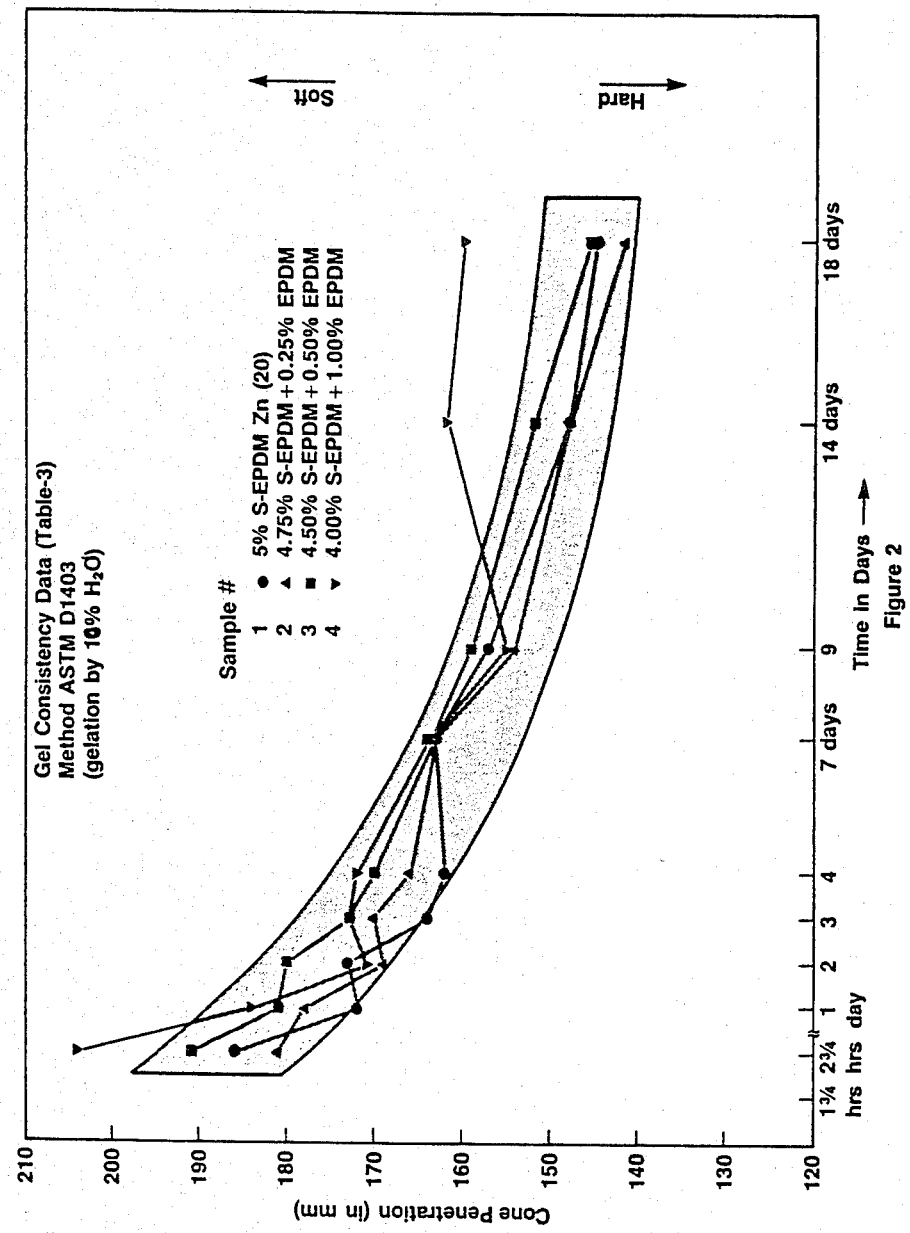
FIG. 2 illustrates the gel consistency of polymers of the instant invention wherein gelation was by 10% water.

In this series of experiments, in order to produce relatively softer gels, the solutions of Example 2 were gelled with a lesser amount of water. The procedure of producing the gels was exactly the same as described in Example 3. The ratio of water used to the solution was 10%, i.e., to 50 c.c. of each solution of Example 3, 5 c.c. of water was added under high shear. The gel strength data of various samples are shown in Table 3 and FIG. 2.

TABLE 3

Gel Consistency of Samples of Table 1
5 Sec. Penetration by ½ Scale Cone in m.m.
Gelation by 10% Water

| Time Elapsed After Gelation | Sample No. 1 (5% TP-319) | Sample No. 2 (4.75% TP-319 + 0.25% EPDM) | Sample No. 3 (4.50% TP-319 + 0.50% EPDM) | Sample No. 4 (4.0% TP-319 + 1.0% EPDM) |
|---|---|---|---|---|
| 1 hr, 45 min. | — | — | — | — |
| 2 hrs, 45 min. | 186 m.m. | 181 m.m. | 191 m.m. | 204 m.m. |
| 1 day | 171 m.m. | 178 m.m. | 181 m.m. | 284 m.m. |
| 2 days | 173 m.m. | 169 m.m. | 180 m.m. | 171 m.m. *(1.0 c.c.) |
| 3 days | 164 m.m. | 170 m.m. | 173 m.m. | 173 m.m. *(0.2 c.c.) |
| 4 days | 162 m.m. | 166 m.m. | 170 m.m. | 172 m.m. *(0.1 c.c.) |
| 7 days | 163 m.m. | 163 m.m. | 163 m.m. | 164 m.m. (slight) |
| 9 days | 157 m.m. | 154 m.m. | 159 m.m. | 155 m.m. (slight) |
| 14 days | 148 m.m. | 148 m.m. | 152 m.m. | 162 m.m. (v. slight) |
| 18 days | 145 m.m. | 142 m.m. | 146 m.m. | 160 m.m. (v. slight) |

*Excess liquid expelled by gel and poured off before measurements.

From both the tables and figures of Examples 3 and 4, it is clear that at any given instant there are no substantial differences in the strength of various samples. Thus, for example, the gel strength measurements made after about 7 days, samples no. 2, 3, and 4 in which the associating polymer content has been replaced by the non-associating polymer by 5, 10, and 20% by weight, respectively, have the same gel strength as sample no. 1, which solely comprised of the associating polymer.

Since the costs of non-associating polymers are generally significantly lower than the associating polymers, the economic incentives to use the blend systems as described in this invention are obvious.

What is claimed is:

1. A process for forming a thickened fluid have a viscosity of at least about 50 cps which includes the steps of:
   (a) forming two solvent systems, one of an organic liquid and the other of said organic liquid and a polar cosolvent, said polar cosolvent being less than about 15 weight percent of each said solvent system, a viscosity of each said solvent system being less than about 100 cps;
   (b) dissolving a water insoluble sulfonated elastomeric polymer in said first solvent system to form a first solution, a concentration of said sulfonated polymer in said first solution being about 0.2 to about 10 weight percent, a viscosity of said first solution being less than about 2000 cps;
   (c) dissolving an elastomeric polymer in said second solvent system of said organic liquid to form a second solution, a concentration of said elastomeric polymer in said second solution being about 0.02 to about 10 weight percent, a viscosity of said solution being less than about 2000 cps, said water insoluble sulfonated elastomeric and said elastomeric polymer having the same polymeric backbone;
   (d) mixing said first solution and said solution to form a solution of said sulfonated elastomeric polymer and said elastomeric polymer; and
   (e) adding about 5 to about 500 volume percent water to said solution of said sulfonated elastomeric polymer and said elastomeric polymer, said water being immiscible with said solution of said sulfonated elastomeric polymer and said elastomeric polymer, said polar cosolvent transferring from said organic liquid to said water thereby causing the viscosity of said organic liquid to increase to at least 5000 cps.

2. A process according to claim 1 further including a means for removing said aqueous fluid from said gelled organic liquid.

3. A process according to claim 1, wherein said sulfonated polymer is an unneutralized or neutralized sulfonated polymer which has about 5 (free acid) to about 50 meq. of pendant $SO_3H$ groups per 100 grams of said sulfonated polymer.

4. A process according to claim 3 wherein said $SO_3H$ are neutralized within an ammonium or metal counterion.

5. A process according to claim 4 wherein said metal counterion is selected from the group consisting of antimony, tin, lead or Groups IA, IIA, IB and IIB of the Periodic Table of Elements.

6. A process according to claim 4 wherein said $SO_3H$ groups are at least 90 mole percent neutralized.

7. A process according to claim 1 wherein said elastomeric polymer is an EPDM terpolymer.

8. A process according to claim 1 wherein said polar cosolvent has a greater polarity than said organic liquid.

9. A process according to claim 1 wherein said polar cosolvent is selected from the group consisting of aliphatic alcohols, aliphatic amines, di-or trifunctional aliphatic alcohols, water miscible amides, acetamides, phosphates, and lactones and mixtures thereof.

10. A process according to claim 1 wherein said polar cosolvent is selected from the group consisting of methanol, ethanol, propanol, and isopropanol and mixtures thereof.

11. A process according to claim 1 wherein said polar cosolvent has a solubility parameter of at least about 10 and is water miscible.

12. A process according to claim 1 wherein said organic liquid is selected from the group consisting of aromatic hydrocarbons, ketones, chlorinated aliphatic hydrocarbons, aliphatic hydrocarbons, cyclic aliphatic ethers, aliphatic ethers and organic aliphatic esters and mixtures thereof.

13. A process according to claim 1 wherein said organic liquid is selected from the group consisting of aliphatic hydrocarbons and aromatic hydrocarbons.

14. A process according to claim 1 wherein said organic liquid is selected from the group consisting of benzene, toluene, ethyl benzene, xylene and styrene and mixtures thereof.

15. The process according to claim 1 wherein said first solution and said second solution are mixed together under high shear conditions.

16. The process according to claim 1 wherein a molar ratio of said sulfonated elastomeric polymer to said elastomeric polymer is about 1 to about 25.

* * * * *